United States Patent [19]

Fischer et al.

[11] Patent Number: 5,239,001

[45] Date of Patent: Aug. 24, 1993

[54] TERNARY POLYMER MIXTURES

[75] Inventors: Jens-Dieter Fischer, Bickenbach; Werner Siol, Darmstadt-Eberstadt, both of Fed. Rep. of Germany

[73] Assignee: Röhm GmbH Chemische Fabrik, Darmstadt, Fed. Rep. of Germany

[21] Appl. No.: 751,960

[22] Filed: Aug. 29, 1991

[30] Foreign Application Priority Data

Sep. 27, 1990 [DE] Fed. Rep. of Germany ....... 4030553

[51] Int. Cl.$^5$ .................... C08L 69/00; C08L 67/02; C08L 33/04
[52] U.S. Cl. .................... 525/133; 525/64; 525/67; 525/148
[58] Field of Search ............ 525/133, 148, 67, 64

[56] References Cited

U.S. PATENT DOCUMENTS

| | | | |
|---|---|---|---|
| 4,774,286 | 9/1988 | Taubitz | 525/67 |
| 4,782,692 | 11/1988 | Allen | 525/439 |
| 4,963,618 | 10/1990 | Sasaki | 525/67 |
| 4,966,942 | 10/1990 | Sasaki | 525/67 |
| 4,997,883 | 3/1991 | Fischer | 525/67 |

FOREIGN PATENT DOCUMENTS

| | | |
|---|---|---|
| 0272425 | 6/1988 | European Pat. Off. |
| 297285 | 1/1989 | European Pat. Off. |
| 0326938 | 8/1989 | European Pat. Off. |
| 719239 | 12/1988 | Fed. Rep. of Germany |
| 4003088 | 8/1991 | Fed. Rep. of Germany |

OTHER PUBLICATIONS

Encyclopedia of Chemical Technology, vol. 18, third edition, pp. 463-466, 1982, Kirk-Ohtmer, "Plant-Growth Substances to Potassium Compounds".

*Primary Examiner*—David J. Buttner
*Attorney, Agent, or Firm*—Oblon, Spivak, McClelland, Maier & Neustadt

[57] ABSTRACT

The invention relates to ternary polymer alloys comprised of thermoplastic polymers which alloys are comprised of the following components:

A) 0.1–99.9 wt. % of a polyester-polycarbonate mixture comprised of:
   a.1) 0.1–99.9 parts by weight (pbw) of a polyester, and
   a.2) 99.9–0.1 pbw of a polycarbonate; and
B) 99.9–0.1 wt. % of a poly(meth)acrylate ester PA containing 20–100 pbw of units of at least one monomer of formula I

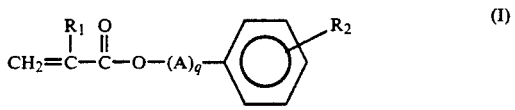

where
$R_1$ represents hydrogen or methyl, $R_2$ represents hydrogen a $C_{1-6}$ alkyl group or a group —$(CH_2)_n$—$QR_3$,
where
n represents zero or a number in the range 2–6, and
Q represents oxygen or a group —$NR_4$, and
$R_3$ and $R_4$ mutually independently represent hydrogen or a $C_{1-4}$ alkyl group; and
A represents a $C_{1-4}$ alkylidene group or a group —$(CH_2)_m$—O—,
where
m is a number from 2 to 6, and
q is zero or 1 wherein the sum of the wt. % of components (A) and (B) is 100% and the sum of the pbw figures of components (a.1) and (a.2) is 100 pbw.

4 Claims, No Drawings

TERNARY POLYMER MIXTURES

BACKGROUND OF THE INVENTION

1. Field of the Invention

The present invention relates to compatible ternary polymer mixtures comprising polycarbonate polymers, polyalkylene terephthalate polymers, and methacrylate copolymers, which mixtures are compatible with polyesters and with polycarbonate.

2. Discussion of the Background

The modification of plastics of the polycarbonate (PC), polyester (PE), and polyester carbonate type, to render them impact resistant is well known (U.S. Pat. No. 4,906,699). Such modified plastics are used as molding compounds, e.g. for injection molding of parts for housings, bumpers, etc. Modifying-agents with a core-and-shell structure have proved particularly effective.

For polyesters, polymeric core-and-shell modifiers have been employed having core material comprised of alkyl acrylate and shell material comprised of alkyl methacrylates and/or styrene copolymers.

For addition to polycarbonates, ABS copolymers, or acrylate modifiers have been used, preferably with styrene-acrylonitrile copolymers in the outermost graft shell.

There are also on the market blends comprised of polycarbonate and polybutylene terephthalate, containing acrylate modifiers, wherein the core of the modifier comprises butyl acrylate and the shell comprises methyl methacrylate and/or styrene-acrylonitrile copolymers.

Compatible blends comprising polyesters and polyaryl acrylates are proposed in unpublished DE-40 03 088.1.

The principal claimed subject matter of EP 297,285 comprises transparent thermoplastically processible binary polymer mixtures comprised of polycarbonates and of methacrylate copolymers, wherein the methacrylate copolymers are comprised of the following:

95-5 wt. % of methyl methacrylate, and 5-95 wt. % of (meth)acrylate esters with cyclic group in the ester moiety.

Not withstanding the few successes in producing transparent thermoplastic compositions, technical experience with mixtures comprised of disparate polymers was summarized relatively early with the statement, "Miscibility is the exception, immiscibility is the rule" (see Kirk-Othmer, 1982, "Encyclopedia of Chemical Technology", 3rd Ed., pub. J. Wiley, Vol. 18, p. 460). Despite a growing number of counter-examples discovered in recent years, the above statement is characterizing experience in this area of technology which still represents the expectations of those skilled in the art.

It is not by chance that interest in compatible polymer mixtures has grown recently. As a rule, compatible polymer mixtures have the advantage of being transparent To the extent they are comprised of thermoplastics, they generally have good thermoplastic processibility. In addition, they frequently open up new possibilities for reusability and recycling.

Due to the uniform composition, the mechanical properties are generally adjustable, reproducible, and quite advantageous. However, the prospect of obtaining industrially usable compatible polymer mixtures in ternary mixed systems must be deemed unfavorable.

SUMMARY OF THE INVENTION

Nonetheless it has been discovered, surprisingly, in connection with the present invention, that certain ternary mixtures of thermoplastic polymers form compatible transparent polymer alloys PL.

Accordingly, an object of the present invention is to provide a compatible ternary mixture of thermoplastic polymers. The object of the present invention is provided for by polymer alloys PL comprised of the following components:

A) 0.1-99.9 wt. %, preferably 50-95 wt. %, of a polyester-polycarbonate mixture comprised of:

a.1) 0.1-99.9 parts by weight (pbw), preferably 10-50 pbw, of a polyester, and a.2) 99.9-0.1 pbw, preferably 90-50 pbw, of a polycarbonate; and B) 99.9-0.1 wt. %, preferably 5-50 wt. %, of a poly(meth)acrylate PA containing 20-100 pbw, preferably 50-95 pbw, of units of at least one monomer of formula I

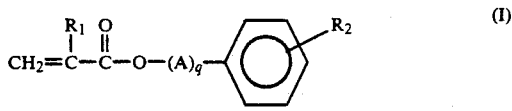

where $R_1$ represents hydrogen or methyl, $R_2$ represents a $C_{1-6}$ alkyl group or a group $-(CH_2)_n-QR_3$, where n represents zero or a number in the range of 2-6, and Q represents oxygen or a group $-NR_4$, and $R_3$ and $R_4$ each independently represents hydrogen or a $C_{1-4}$ alkyl group; and A represents a $C_{1-4}$ alkylidene group or a group $-(CH_2)_m-O-$, where m is a number from 2 to 6, and q is zero or 1, with the condition that the sums of the wt. % and pbw figures are, respectively, 100 wt. % and 100 pbw.

DETAILED DESCRIPTION OF THE PREFERRED EMBODIMENTS

In the context of the present invention, "polyesters" have the customary definition of polycondensation products of hydroxycarboxylic acids, or of polyhydric alcohols (diols or polyols), with polybasic carboxylic acids (dicarboxylic acids or polycarboxylic acids). (See Kirk-Othmer, 1982, "Encyclopedia of Chemical Technology", 3rd Ed., pub. J. Wiley, Vol. 18, pp. 549-594.) They are represented by general formula II:

where R represents a suitable hydrocarbon group; or preferably they are represented by formula II-A:

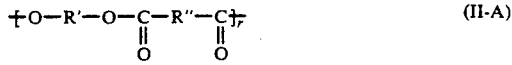

where R' represents a $C_{2-8}$ alkylene group or a $C_{3-3}$ cyclic alkylene group, and R″ represents an aryl group, particularly a phenyl or naphthyl group, and m and r in formulas II and II-A each represents a number corresponding to weight average a molecular weight $\overline{M}w$ of the polymers in the range $10 \times 10^3 < \overline{M}w \leq 200 \times 10^3$ Dalton. The determination of the molecular weight $\overline{M}w$ is carried out, as a rule, via the solution viscosity $\eta_{sp}/C$ (in units of cm/g), measured by a capillary viscometer.

In particular, the polyesters may be represented by formula II-A′:

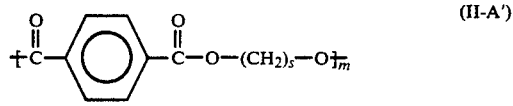
(II-A′)

where s represents a number from 2 to 6, and m has the above-designated meaning.

The final degrees of saturation of the polymers correspond to those commonly found in, e.g., commercial products.

Of particular industrial interest are the polyesters of formula II-A′ wherein s=2 or 4 or 6, particularly s=2 (polyethylene terephthalate, PET) and s=4 (polybutylene terephthalate, PBT).

As a rule, the polyesters based on terephthalic acid contain <10 wt. % isophthalic acid.

It should be emphasized that the polyesters used are generally commercially available and if necessary or desirable, these may contain additives which are per se known, e.g. nucleation agents, pigments, flame-proofing agents, etc.

The term "polycarbonate" (PC, according to DIN 7728 Tl) in the present context has the customary definition of the formal polycondensation products of diols, particularly 4,4′-dihydroxydiphenyl alkanes (bisphenols), with carbonic acid.

The molecular weight $\overline{M}w$ of the polycarbonates is generally in the range of 20,000–60,000. (See Kirk-Othmer, 1982, "Encyclopedia of Chemical Technology", 3rd Ed., pub. J. Wiley, Vol. 18, pp. 479–494; Schnell, H., "Chemistry & Physics of Polycarbonates".)

As a rule, the polycarbonates can be represented by formula III:

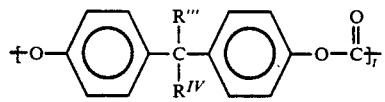

where R′″ and R$^{IV}$ each independently represents hydrogen, linear or branched $C_{6-12}$ alkyl group, or a $C_{6-12}$ aryl group, and t represents a number corresponding to a molecular weight $\overline{M}w$ of the polymer in the range of $2-6 \times 10^4$. The dynamic glass transition temperature Tg (dyn) is generally about 160° C. (see "Kunststoff-Handbuch", pub. Carl Hanser Verlag, Vol. IX, p. 310; and Kirk-Othmer, 1982, 3rd Ed., J. Wiley, Vol. 18, pp. 479–497). The preparation of polycarbonates is described in, U.S. Pat. No. 1,999,835 and Brit. Pat. 772,627.

The homo- and copolymers PA are manufactured according to known methods. (See Rauch-Puntigam, H., and Voelker, Th., 1967, "Acryl- und Methacrylverbindungen", pub. Springer-Verlag.) While it is possible to employ anionic polymerization or group transfer polymerization (see also Webster, O. W., et al., 1983 J. Am. Chem. Soc., 105, 5706), the preferred manufacturing technique is radical polymerization. One may also employ polymerization in the mass, solution polymerization, or emulsion polymerization.

The monomers which are candidates for producing the polymers PA are per se known:

One might mention, as monomers of formula I: phenyl (meth)acrylate and $C_{1-6}$ alkyl-, $C_{1-6}$ alkoxy-, and $C_{1-6}$ alkylamine substituted derivatives of phenyl (meth)acrylate; particularly, p-methoxyphenyl (meth)acrylate. Also, N,N-dialkylamino-substituted phenyl (meth)acrylates, e.g. p-N,N-dimethylaminophenyl methacrylate.

Also of interest are (alkoxy)phenyl methacrylates not directly bound to the (meth)acryloyl group, e.g. phenoxyethyl methacrylate $(A = -CH_2-CH_2-O-)$. To be emphasized, however, are alkoxyphenyl (meth)acrylates, particularly methoxyphenyl methacrylate, and also phenyl methacrylate.

The polyaryl (meth)acrylates may also be comprised of a variety of types of monomer units, preferably those of formula I. To the extent that the polymers PA are not exclusively comprised of monomer units of formula I, other esters of (meth)acrylic acid may be used as comonomers, particularly those of formula IV:

(IV)

where $R_1'$ represents hydrogen or methyl, $R_5$ represents a $C_{1-12}$ aliphatic group, or a $C_{2-8}$ alkyl group which is substituted with a group X, where X represents an $-OH$, $-OR_6$, or $-NR_7R_8$ group, where $R_6$ represents a $C_{1-6}$ alkyl group or a $C_{1-6}$ alkoxy group, $R_7$ represents hydrogen or a $C_{1-6}$ alkyl group, and $R_8$ represents a $C_{1-6}$ alkyl group, or $R_7$ and $R_8$ together
   form a 5- or 6-membered ring, preferably saturated,
   which includes another nitrogen or an oxygen; or styrene or p- or α-methylstyrene.

In the radical polymerization method one may preferably use the customary radical initiators, e.g. peroxide initiators, particularly organic peroxy compounds, or azo compounds, in amounts of 0.01–1 wt. % (based on the weight of the monomers). The molecular weight regulators used may be, e.g., the customary sulfur regulators, in the known advantageous concentrations, e.g. 0.01–2 wt. % (based on the weight of the monomers).

The molecular weights $\overline{M}w$ of the polymers PA are, as a rule, $>3,000$, generally in the range 10,000–2,000,000, preferably 20,000–300,000 (as determined by light scattering) (see Mark, H. F., et al., 1987, "Encyclopedia of Polymer Science & Engineering", 2nd Ed., pub. J. Wiley, Vol. 10, pp. 1–19). In choosing the monomer components which may be used as comonomers in preparing the polymers PA, one should take into account that the glass temperature (Tg) of the resulting polymer does not crucially affect the technical applicability of the overall system PL.

Another embodiment of the present invention comprises polymer mixtures PL′ which are comprised of:

5-95 wt. % of component (A) as described above in connection with the polymer alloys PL;

C) 95-5 wt. % of an impact strength modifying agent PC which is a mixed polymer comprising at least two phases, which mixed polymer is comprised of:

c.1) 20-90 pbw of a possibly crosslinked polymer PB with a glass temperature Tg $\leq 10°$ C., preferably $\leq -10°$ C.; and c.2) 80-10 pbw of a polymer PA' which is at least partly covalently bonded (generally at least 5 wt. %) to component (c.1), is compatible with component (A) (comprised of polycarbonate and polyester), and corresponds in its composition to polymer PA of component (B).

Another embodiment of the invention comprises a copolymer PD, comprised of:

d.1) 99-50 wt. % of units of a monomer of formula I as described above in connection with (B), and d.2) 1-50 wt. % of units of a comonomer with UV-absorbing groups, and/or a polymer comprised of:

d.3) 99-50 wt. % of units of a monomer of formula I as described above in connection with (B), and d.4) 1-50 wt. % of a low molecular weight UV-absorber, wherein said copolymer is applied in coatings over the polyester-polycarbonate mixtures according to (A), for stabilization against UV light.

The impact strength modifying agent PC in the polymer mixtures PL' is, according to the definition, a two-phase mixed polymer, the component PA' of which (c.2) can be manufactured analogously to the above-described polymers PA.

The component PB is generally crosslinked, and provides a rubber-like phase, which are per se known, preferably in the region of molecular weights $\overline{M}w$ of $10^4$-$10^7$ Dalton. (See, e.g., Vollmert, B., 1982, "Grundriss der makromolekularen Chemie", pub E. Vollmert-Verlag, of Karlsruhe, ol. IV, pp. 129 ff.) Accordingly, PB is, e.g., polybutadiene, polyisoprene, or another polyolefin, e.g. EPDM, or is a polyacrylate, e.g. polyethyl-, polybutyl-, or poly-2-ethylhexyl acrylate. In a particularly preferred case, one begins with a core-and-shell latex wherein the latex core (diameter 100-500 nm) is comprised of the elastomer, e.g. crosslinked polybutadiene or crosslinked polybutyl acrylate. A shell of polyaryl acrylate is grafted onto this core. (For graft polymerization, see Houben-Weyl, 1987, "Methoden der Organischen Chemie", pub. Georg-Thieme-Verlag, [Vol.] E20, Part 1, pp. 626 ff.)

Such core-and-shell lattices can be used as impact strength modifiers for component (A), after water is removed from the latex by, e.g., spray drying. In such an arrangement the elastomer (e.g. the polybutyl acrylate) is connected to component (A) via the polyacrylate PA'. Such polymer mixtures have good processibility, and can contribute significantly to the impact strength (measured by the notched bar impact test) of the component (A).

The copolymer PD is, according to definition, comprised of units of the monomer of formula I and comonomers with UV-absorbing groups according to (d.2), such as are disclosed in U.S. Pat. No. 4,576,870 and EP 0,368,094. In general, the copolymers PD have molecular weights $\overline{M}w$ in the range of 5,000 to 5,000,000. Polymerizable UV-absorbers which might be mentioned as examples are 2-(2'-hydroxyphenyl)-5-methacrylamido-benzotriazole and 2-hydroxy-4-methacryloxybenzophenone. (See also Houben-Weyl, 4th Ed., pub. Verlag Chemie, Vol. 15, pp. 256-260.)

The low molecular weight UV-absorbers according to (d.4) are also per se known. Thus, the polymerizable compounds according to (d.2) may be used advantageously in their monomeric forms in the copolymers PD, as low molecular weight UV-absorbers. Additional UV-absorbers with molecular weight Mw<5000 are 2-hydroxy-4-n-octoxybenzophenone, 2-hydroxy-4-methoxybenzophenone, 2-(2'-hydroxy-5'-methylphenyl)benzotriazole, and other derivatives of 2-hydroxybenzophenone or benzotriazole; as well as 2,4-dihydroxybenzoyl-furan, phenyl salicylate, resorcinol disalicylate, resorcinol mono- and dibenzoate, benzyl benzoate, stilbene, and $\beta$-methylumbelliferone and its benzoate. Numerous other UV-absorbers are known and are commercially available. Particularly preferred are UV-absorbers of low volatility at the processing temperature, i.e. those with a molecular weight which is as high as possible. In the concentration selected, the UV-absorber would be distributed maximally homogeneously in the polymer.

The characterization of the inventive polymer mixtures PL as compatible mixtures is according to recognized criteria (see Kirk-Othmer, loc. cit., Vol. 18, pp. 457-460; and Brandrup-Immergut, 1975, "Polymer Handbook", 2nd Ed., pub. Wiley Interscience, Vol. III, p. 211):

i) When optical methods are used, one observes in the inventive polymer mixtures PL a single index of refraction which is between those of the two polymer components (A) and (B).

ii) The polymer mixtures PL have a single glass transition temperature Tg (which is between those of the polymer components).

As another test of the miscibility of polymers, one employs the existence of a "lower critical solution temperature" (LCST). A LCST represents the phenomenon whereby during heating, the formerly clear mixture separates into phases and becomes optically cloudy. This phenomenon is clear proof that the original polymer mixture consisted of a single homogeneous phase in equilibrium.

Further, polymer mixtures can display the phenomenon of an "upper critical solution temperature" (UCST). In the opposite behavior as that with an LCST, such polymer mixtures are compatible (single-phase) at higher temperatures, and are incompatible (displaying phase separation) at lower temperatures (see Olabisi, O., Robeson, L. M., and Shaw, M. T., 1979, "Polymer-Polymer Miscibility", pub. Academic Press; and Kirk-Othmer, loc. cit., pp. 457-460; and Ger. Pat. App. P 37 08 428.3). With the present polymer mixtures PL it is preferred to have the LCST phenomenon.

Production of the Mixtures PL

The compatible polymer mixtures can be produced by various methods: e.g., by intensive mechanical intermixing of components (A) and (B) in the melt, in an extruder, or etc.; or by solution-casting from a common solvent, as so-called "solution-cast polyblends" (see Kirk-Othmer, 1982, "Encyclopedia of Chemical Technology", 3rd Ed., pub. J. Wiley, Vol. 18, pp. 443-478). Also, polymer (A) may be dissolved in the mixture of the monomer(s) of the other polymer, (B), wherein polymer (B) is then produced in the presence of polymer (A). Also, the polymer mixture PL may be produced from common precipitation agents. There are no restrictions on the type of mixture. As a rule, one first produces mixtures of components (A) and (B), wherein advantageously one begins with solids in the form of, e.g., bead or granulate of the polymer(s), employing slow mixing apparatus such as, e.g., a drum mixer, an open-wheel-type mixer, and a double chamber plow-type mixer. The slow mixing apparatuses produce a mechanical mixture without disturbing the phase boundaries (see "Ullmanns Encyclopaedie der technischen Chemie", 4th Ed., pub. Verlag Chemie, Vol. 2, pp. 282-311). This is followed by thermoplastic processing involving homogeneous mixing in the melt, with the use of heatable mixing apparatuses at suitable temperatures for the purpose, e.g. 150° C.—about 300° C., in kneader mixers or preferably extruders, e.g. single- or multi-screw extruders, or possibly extruders with oscillating screws and shear bars (e.g. the Bussco kneader). By this method one can produce a uniform granulate (e.g. hot-chopped granulate, cubic granulate, or round granulate). The particle size of the granules is in the range 2-5 mm here.

Advantageous Effects

The inventive ternary polymer mixtures PL are of interest to industry merely on the basis of their compatibility, although they may have other advantageous properties as well. The inventive polymer mixtures are ordinarily highly transparent and colorless. It is apparent that if one forms alloys with homopolymers or copolymers of monomers of formula I, in amounts >20 wt. %, in mixtures of partially crystalline polyesters and polycarbonates, one can appreciably reduce the degree of crystallinity of the polyesters. This is beneficial to the transparency and to the mechanical properties of the flowable polycarbonate-polyester compositions.

Another interesting application possibility is provide by modifying the low temperature notched-bar-test impact strength of polycarbonate-polyester mixtures by means of adding high impact phases (polymer mixtures PL') which preferably comprise crosslinked elastomers onto which a compatible hard phase PA' is grafted which phase PA' has a composition corresponding to that of the polymer PA. Further, there is an industrially significant possibility afforded by the invention whereby polymers from the monomers of formula I or with a content of statistically distributed low molecular weight UV-absorbers are used as coating layers for the UV-labile polycarbonate-polyester blends according to (A).

Having generally described this invention, a further understanding can be obtained by reference to certain specific examples which are provided herein for purposes of illustration only and are not intended to be limiting unless otherwise specified.

The following Examples serve to illustrate the invention. Unless stated otherwise the product MAKROLON ® 3100 of Bayer AG was used as the polycarbonate component, and the polybutylene terephthalate VESTODUR ® 1000 of Huels AG with a crystallinity of 30% was used as the polyester component.

The compatibility was determined by the criterion of the existence of an LCST (see Paul, D. R., 1985, "Polymer Blends & Mixtures", pub. Martinus Hijhoff Publishers, of Dosdrecht and Boston, pp. 1-3). For this purpose, the cloud point $T_{tr}$ was determined experimentally, e.g. using a Kofler heating apparatus (see 1950 *Chem. Ing. Teghnik* 289).

EXAMPLES

Example 1

80 wt. % of polycarbonate was mixed in a mixing extruder with 10 wt. % of polybutylene terephthalate and 10 wt. % of a copolymer of methyl methacrylate (50 pbw) and phenyl methacrylate (50 pbw). The result was a clear melt and a clear, amorphous blend having a cloud point (LCST) of about 170° C.

Example 2

80 wt. % of polycarbonate was mixed with 10 wt. % of polybutylene terephthalate 1000 and 10 wt. % of polyphenyl methacrylate, analogously to Example 1. Again the melt and the blend were clear. The blend had an LCST of about 180° C.

Example 3

80 wt. % of polycarbonate was mixed with 10 wt. % of polybutylene terephthalate and 10 wt. % of a copolymer of p-methoxyphenyl methacrylate (50 pbw) and methyl methacrylate (50 pbw). The transparent blend had an LCST of about 180° C.

Example 4

70 wt. % of polycarbonate was mixed with 20 wt. % of polybutylene terephthalate and 10 wt. % of polyphenyl methacrylate. The extruded blend was transparent to translucent, and had an LCST of about 140°-150° C.

Example 6

60 wt. % of polycarbonate was mixed with 20 wt. % of polybutylene terephthalate and 20 wt. % of a copolymer of phenyl methacrylate (50 pbw) and methyl methacrylate (50 pbw). The melt was clear, and the extruded blend was translucent, with LCST about 140° C.

Example 6 (Comparison Example)

90 wt. % of polycarbonate was mixed with 10 wt. % of polybutylene terephthalate, according to Example 1. The resulting blend wa translucent. No de-mixing indicative of compatibility (i.e. an LCST) could be established.

Example 7 (Comparison Example)

80 wt. % of polycarbonate was mixed with 20 wt. % of polybutylene terephthalate. The resulting blend as translucent to opaque. Again no de-mixing of the blend could be detected.

Example 8

65 wt. % of polycarbonate was mixed with 20 wt. % of polybutylene terephthalate and 15 wt. % of a graft copolymer of EPDM and methyl methacrylate/phenyl methacrylate (weight ratio 33:34:33), analogously to Example 1. The resulting blend was opaque (based on the difference in index of refraction between the elastomer phase and the matrix phase), but had high gloss (indicating compatibility between the graft branch and the matrix phase, and therefore indicating good bonding of the elastomer phase) and good flexural toughness.

Example 9

Production of a core-and-shell modifying agent by emulsion polymerization

In a 7-L reaction vessel (Witt vessel), an emulsion comprised of 2925 g $H_2O$, 1940 g butyl acrylate, 9.75 g allyl methacrylate, 5 g $C_{15}$-paraffinsulfonate sodium salt, and 0.004 g $FeSO_2$ was produced, was heated to 40° C., and was reacted with 1.9 g $K_2S_2O_8$ and 1.4 g $Na_2S_2O_5$.

After 45 min the mixture was heated to 80° C. and over a period of 2 hr an emulsion comprised of the following components was added dropwise: 325 g methyl methacrylate, 318.5 g phenyl methacrylate, 6.5 g methyl acrylate, and 3.9 g 2-ethylhexylthioglycolate, in: 975 g $H_2O$, 2 g $C_{15}$-paraffinsulfonate sodium salt, and g $K_2S_2O_8$. For the final polymerization, the resulting dispersion was maintained at 80° C. for 1 hr. The solids content was 40 wt. % and the solid was isolated by freeze coagulation.

The core radius was 64 nm and the shell radius was 74 nm. The comonomer ratio in the hard phase (shell) was (wt. %) 50:49:1, methyl methacrylate to phenyl methacrylate to methyl acrylate.

Example 10

66.7 wt. % of polycarbonate was mixed with 20 wt. % of polybutylene terephthalate and 13.3 wt. % of a core-and-shell modifying agent according to Example 9. The resulting blend had the following properties:

VST-B (C) (DIN 5346) 118° C.

Impact strength (in notched bar test)

ISO 180/1A (KJ/sq m) (DIN 53453)
at 23° C.    58 (partial breakage)
at −20° C.   20

E-modulus (mPA) (DIN 53457) 2190,
Elongation at failure (%) (DIN 53455) 165%.
Melt viscosity (Pa.sec), 260° C., 5 N 375.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ternary polymer alloy of thermoplastic polymers comprising:
   A) 0.1–99.9 wt. % of a polyester-polycarbonate mixture comprised of:
       a.1) 0.1–99.9 parts by weight (pbw) of a polyester, and
       a.2) 99.9–0.1 pbw of a polycarbonate; and
   B) 99.9–0.1 wt. % of a poly(meth)acrylate ester PA containing 20–100 pbw of units of at least one monomer of formula I

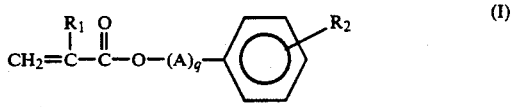

where
$R_1$ represents hydrogen or methyl, $R_2$ represents hydrogen, a $C_{1-6}$ alkyl group or a group $-(CH_2)_n-QR_3$,
where
n represents zero or a number in the range of 2–6, and
Q represents oxygen or a group $-NR_4$, and
$R_3$ and $R_4$ each independently represent hydrogen or a $C_{1-4}$ alkyl; and
A represents a $C_{1-4}$ alkylidene group or a group $-(CH_2)_m-O-$,
where
m is a number from 2 to 6, and
q is zero or 1; and
wherein the sum of the wt. % of components (A) and (B) is 100 wt. % and the sum of the pbw figures of components (A.1) and (a.2) is 100 pbw;
wherein said ternary polymer alloy has a single glass transition temperature $T_g$.

2. The ternary polymer alloy of claim 1, wherein said poly(meth)acrylate contains 50–95 pbw of units of the monomer of formula I.

3. The ternary polymer alloy of claim 1, wherein the amount of polyester -polycarbonate is 50–95 wt. %.

4. The ternary polymer alloy of claim 1, wherein the polyester-polycarbonate mixture comprises 10–50 pbw of a polyester and 90–50 pbw of a polycarbonate.

* * * * *